Patented Dec. 25, 1928.

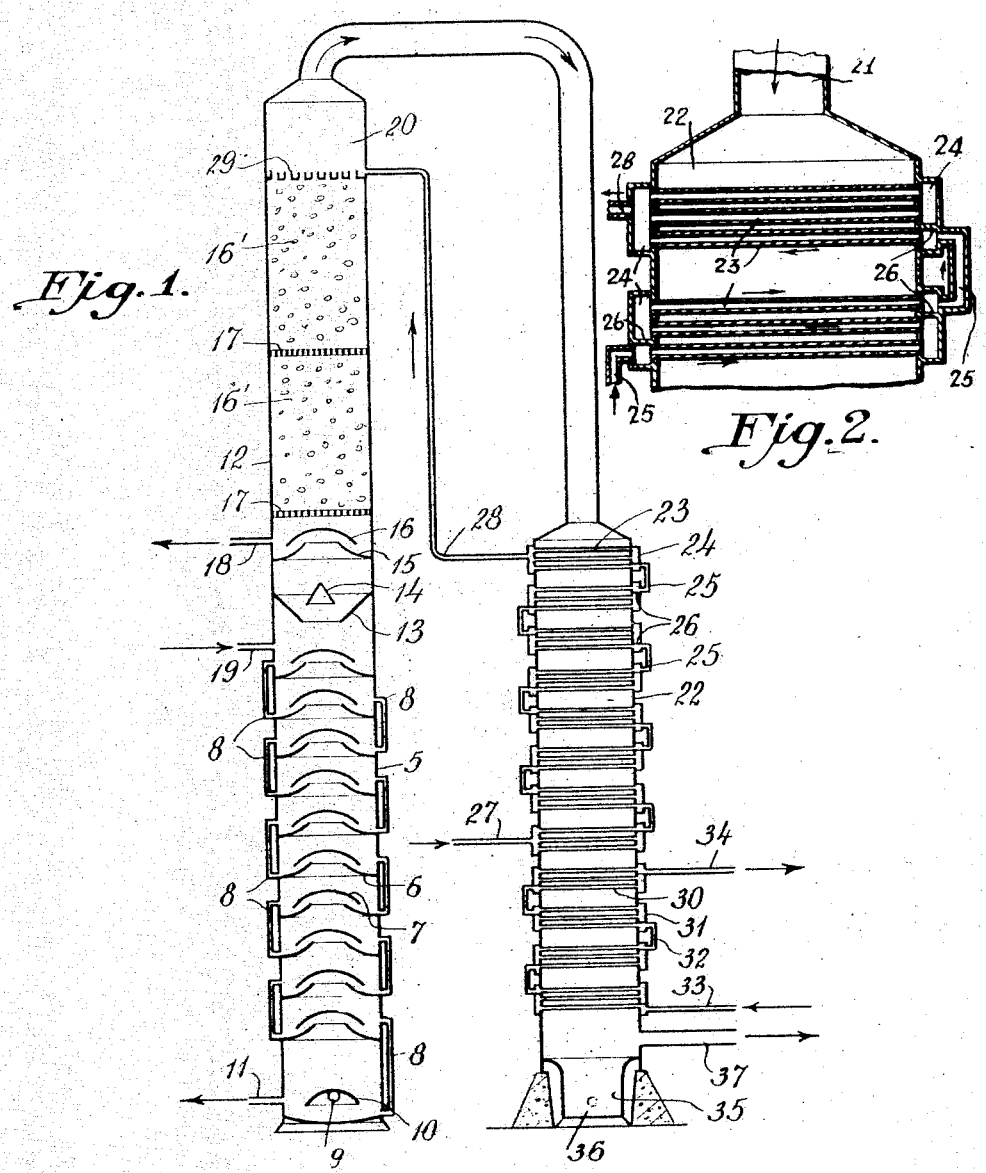

1,696,224

UNITED STATES PATENT OFFICE.

HARALD AHLQVIST, OF RYE, NEW YORK.

METHOD FOR TREATING FILTER LIQUOR.

Application filed November 17, 1926. Serial No. 148,989.

This invention relates to improvements in the ammonia-soda or "Solvay" process for the manufacture of sodium carbonate, and particularly to the recovery of ammonia from the filter liquor after the precipitated sodium bicarbonate has been separated therefrom.

The filter liquor contains dissolved ammonia both free and combined with carbon dioxide and a large proportion of ammonium chloride. The ammonia can be recovered in part by distillation alone. Ammonium chloride is, however, unaffected by distillation and it is necessary, therefore, to treat the liquor with a suitable reagent which, by combining with the chlorine, releases ammonia.

It has been the practice heretofore to mix milk of lime with the filter liquor and to distill the mixture with steam. The vapors produced by distillation are partially cooled by direct contact with the liquor before it enters the still and further cooled by indirect heat exchange with the liquor and with a cooling medium such as water.

The apparatus used heretofore for treating the liquor consists of a still with a preheater and a heat exchanger superposed thereon, making a very tall and heavy column, the lower parts of which are designed necessarily to support the weight of the superstructure. Because of the great weight of the column it is necessary to provide a firm foundation and if the ground is soft or yielding a large and expensive foundation must be built. Moreover, the column must be housed in a high building and various structural and engineering difficulties are thus introduced.

The initial cost of the apparatus employed is only one of numerous factors which make the prior practice inexpedient and uneconomical. The use of the high column requires a corresponding expenditure of power for the pumping of the liquor and water to relatively great heights and the piping system employed is complicated so that the cost of maintenance is high. The practice permits the condensation of strong ammoniacal liquor in the upper end of the heat exchanger or cooler, thus favoring destruction of the parts by the corrosive action of the condensate. It does not provide, moreover, for the maximum utilization of the cooling effect of the incoming liquor upon the vapors produced by distillation and for the separation and withdrawal of gases released from the liquor as it is heated in the exchanger except by additional complicated piping.

It is the object of the present invention to avoid the difficulties and disadvantages of previously known methods and apparatus for recovering ammonia from filter liquor by providing an improved and simplified method and apparatus including several features which increase the economy of installation and operation.

Another object of the invention is the provision of a method in which full advantage is taken of the cooling effect of the incoming liquor and of the primary separation of gases therefrom.

A further object of the invention is the provision of an apparatus permitting improved operation as described which is simple and less expensive than the apparatus used heretofore and which is not liable to deterioration as the result of condensation of strong ammoniacal liquor therein.

Other objects and advantages of the invention will be apparent as it is better understood by reference to the following specification and the accompanying drawing in which the preferred form of apparatus is illustrated diagrammatically. In this drawing Fig. 1 is a view of the entire apparatus for carrying out my invention, and Fig. 2 an enlarged detail view of the upper portion of the heat exchanger.

I have discovered that the method of separating ammonia from filter liquor derived from the ammonia-soda process can be improved materially by circulating the incoming liquor upwardly and in counter current to the vapors which are produced by the subsequent distillation of the liquor so that the vapors released by the primary heating of the liquor travel therewith and can be separated from the liquor at a suitable point and mingled with the vapors produced by distillation. In this method of operation the vapors travel downwardly and the primary condensate which is principally water containing a relatively small amount of ammonia flows through the apparatus and dilutes the relatively strong ammonia liquor which is subsequently condensed. The operation avoids the production of strong ammoniacal liquor which is capable of attacking and destroying the metal parts of the apparatus.

A suitable apparatus for the practice of the invention includes the usual still and preheater for the liquor and a heat exchanger having therein provision for the upward circulation of the filter liquor in such a way as to ensure maximum heat exchange with the vapors which flow downwardly through the exchanges. Provision for better heat exchange may be made by a suitable arrangement of baffles in the pipe headers between a member of horizontally disposed pipes through which the liquor flows. These pipes may deliver the liquor to the upper end of the preheater and at this point a chamber of suitable size should be provided so that the vapors produced by the initial heating may be released from the liquor. These vapors will mingle with the vapors produced by distillation which come into direct contact with the liquor in the preheater and the mingled vapors will pass downwardly through a pipe of relatively large dimensions provided for that purpose to the top of the heat exchanger. Thus the vapors will first come into contact with the pipes carrying the warm liquor and they will be cooled gradually until they reach the pipes where the fresh liquor is introduced.

Since the vapors may be still considerably warmer than the atmosphere it is desirable to provide an additional series of pipes through which cooling water is circulated, thus affording an opportunity for a condensation of all of the vapors which can be condensed at the temperature of the water. During the heat exchange between the downwardly flowing vapors and the liquor and water in the tubes of the heat exchanger the proportion of ammonia in the condensate increases, but the weaker condensate flowing from the top of the heat exchanger dilutes the stronger ammoniacal liquor and avoids corrosion of the apparatus.

The ammoniacal liquor which collects in the bottom of the heat exchanger can be withdrawn for further treatment, for example, in another still in which no milk of lime is required because the liquor contains no ammonium chloride. The ammonia produced by this still can be stored in any suitable form. The uncondensed vapor from the bottom of the heat exchanger contains carbon dioxide and ammonia. It can be conducted through suitable absorption systems to recover the ammonia and the carbon dioxide, both of which, together with the ammonia distilled from the condensate, can be utilized again in the ammonia-soda process.

In the preferred form of the apparatus the heat exchanger and the column, including the still and the preheater, are distinct and are mounted on separate foundations. By mounting the heat exchanger as a separate unit I am able to reduce the strength of the lower sections of the column, thereby eliminating much of the weight thereof and consequently the size and cost of the foundation can be reduced materially. The column can be housed, moreover, in a lower and less expensive building and the piping arrangement can be simplified. All of these elements are favorable to a materially lower cost of installation of the apparatus which in addition to the advantages hereinbefore mentioned make the system much more economical than any heretofore devised.

A suitable apparatus embodying the invention is illustrated in the accompanying drawing in which 5 indicates a still having therein a plurality of trays 6 and mushroom plates 7. The compartments thus formed in the still are connected by pipes 8 which permit the downward flow of the liquor. Steam is introduced through an inlet 9 beneath a mushroom plate 10 and passes upwardly through the several compartments together with the vapors which are separated from the liquor. The waste liquor is discharged through an outlet 11.

A preheater 12 is superposed upon the still and may contain any suitable arrangement of baffles to ensure contact between the liquor descending therethrough with the vapors which rise past baffles 13 and 14 and the tray 15 and mushroom plates 16. Preferably the preheater is filled with a material 16' such as coke which may be supported on suitable grates 17.

The liquor which has descended through the preheater in contact with the hot vapors from the still is discharged through a pipe 18 to a suitable apparatus (not shown) in which it is mingled with milk of lime. Such apparatus is well known in the art and may consist, for example, of a tank with suitable agitating means therein and provision for the introduction of milk of lime thereto in regulated proportions. The liquor is returned to the still 5 through a pipe 19.

A separating chamber 20 is provided at the top of the preheater 12 and is connected by a pipe 21 of relatively large size to a heat exchanger 22 which includes a series of horizontally arranged pipes 23 terminating in headers 24 and connected by pipes 25. Baffles 26 may be disposed in the pipe headers to ensure maximum contact of the liquor in the pipes with the heat exchange surface as the vapors descend through the exchanger. The filter liquor is introduced through a pipe 27 and travels upwardly through the several series of pipes 23 in heat exchange relation with the vapor and escapes through a pipe 28. The liquor and the vapor formed by the preliminary heating is delivered thereby to the chamber 20 where separation of the vapor occurs. The liquor is distributed by a spray plate 29 which permits it to descend through the preheater. The vapor passes off through the pipe 21 with the vapors produced by distillation to the heat exchanger.

A plurality of sets of pipes 30 similar to the pipes 23 are provided in the lower part of the heat exchanger. These pipes terminate in headers 31 and are connected by pipes 32. A water inlet 33 permits the introduction of cooling water to the pipes 30 to accomplish the final cooling of the descending vapors. The water escapes through an outlet 34.

The condensate descends into a well 35 and is withdrawn through an outlet 36. The uncondensed vapor which consists principally of ammonia and some carbon dioxide is withdrawn through an outlet 37.

The apparatus is equipped with suitable pressure gauges, thermometers, liquor stand glasses, liquor flowmeters and other useful indicators and control mechanism, whereby the operator is enabled to maintain the most efficient operation of the apparatus. The pipes are, of course, equipped with the necessary valves to permit such control. These several parts include the well known equipment for similar apparatus and form no part of the invention.

The operation of the apparatus as described will be readily understood from the foregoing description. The filter liquor enters through the pipe 27 and after traversing the exchanger it is delivered through the pipe 28 to the preheater. At this point the temperature of the liquor has been raised materially and a considerable proportion of the ammonia therein is released and is separated in the chamber 20 where it joins the vapors produced in the still. The remainder of the liquor flows downwardly through the preheater 12, when the free ammonia and carbon dioxide are expelled, and thence through the pipe 18 to the apparatus where it is mixed with milk of lime in suitable proportion to decompose the ammonium chloride in the liquor. It is then returned through the pipe 19 to the still 5 and descends therein in contact with the steam and hot vapors which rise about the mushroom plates. The amount of steam introduced is regulated to produce the desired effect of separating all of the ammonia from the liquor. The extent to which this is accomplished can be determined by examining the waste liquor flowing from the discharge pipe 11. The vapor passes around the successive mushroom plates in the still 5 and finally enters the preheater 12 wherein it gives up a portion of its heat to the descending liquor. Some of the heat is utilized in vaporizing ammonia which is present in an uncombined condition and does not appear, therefore, as sensible heat in the liquor. The rising vapors accumulate more and more ammonia and carbon dioxide as they pass upwardly through the preheater. They are mingled with the vapors discharged into the space 20 by the pipe 28 and the combined vapors descend to the heat exchanger where condensation commences. The first condensate as hereinbefore indicated is principally water with a small amount of ammonia dissolved therein. This weak ammoniacal liquor passes downwardly with the vapors and prevents the formation of a strong ammoniacal liquor which would attack the pipes. The condensate and the uncondensed gas are withdrawn from the bottom of the heat exchanger for subsequent treatment as hereinbefore described.

The invention affords a method and apparatus for the economical separation of ammonia from filter liquor and permits in particular the improved operation with the accompanying advantages which are hereinbefore set forth. Various changes may be made in the details of the operation and in the structural features of the apparatus without departing from the invention or sacrificing the advantages thereof.

I claim:

1. The improvement in the method of separating ammonia from filter liquor produced in the ammonia-soda process, which comprises distilling the liquor, preheating the liquor by direct contact with the vapors produced by distillation thereby causing further vaporization, conducting the vapors thereafter in countercurrent heat exchange with fresh liquor, causing the condensate from the vapors to follow the path thereof during the heat exchange and separately withdrawing the condensate consisting of weak ammonia liquor and the residual uncondensed vapors containing ammonia in the gaseous phase.

2. The improvement in the method of separating ammonia from filter liquor produced in the ammonia-soda process, which comprises distilling the liquor, preheating the liquor by direct contact with the vapors produced by distillation, conducting the vapors thereafter in counter-current heat exchange with fresh liquor, separating vapors produced by heat exchange from the fresh liquor, mingling such vapors with the vapors produced by distillation, causing the condensate from the vapors to follow the path thereof during the heat exchange and separately withdrawing the condensate consisting of weak ammonia liquor and the residual uncondensed vapors containing ammonia in the gaseous phase.

3. The improvement in the method of separating ammonia from filter liquor produced in the ammonia-soda process, which comprises distilling the liquor, preheating the liquor by direct contact with the vapors produced by distillation, introducing fresh liquor in countercurrent heat exchange with the vapors, causing the fresh liquor to follow an upwardly directed path during the heat exchange whereby the vapors produced therefrom travel with the liquor, separating the vapors from the fresh liquor and mingling such vapors with those produced by distillation, withdrawing the condensate consisting of weak ammonia liquor obtained by cooling the mingled vapors and separately withdrawing the residual uncondensed vapors containing ammonia in the gaseous phase.

4. The improvement in the method of separating ammonia from filter liquor produced in the ammonia-soda process, which comprises preheating the liquor, conducting it in counter-current heat exchange and then in direct contact with vapors produced by distilling the liquor to separate free ammonia and carbon dioxide therefrom, mixing the liquor with milk of lime, distilling the liquor with steam, collecting the vapors which result from the distillation and the preheating, cooling the vapors by counter-current heat exchange with the incoming liquor and separately withdrawing the condensate produced consisting of weak ammonia liquor and the residual uncondensed vapors containing ammonia in the gaseous phase.

5. The improvement in the method of separating ammonia from filter liquor produced in the ammonia-soda process, which comprises preheating the liquor, conducting it in counter-current heat exchange and then in direct contact with vapors produced by distilling the liquor to separate free ammonia and carbon dioxide therefrom, mixing the liquor with milk of lime, distilling the liquor with steam, collecting the vapors which result from the distillation and the preheating, cooling the vapors thereafter only by counter-current heat exchange with the incoming liquor and separately withdrawing the condensate produced consisting of weak ammonia liquor and the residual uncondensed vapors containing ammonia in the gaseous phase.

In testimony whereof I affix my signature.

HARALD AHLQVIST.